United States Patent [19]

Kawahara

[11] Patent Number: 5,122,782
[45] Date of Patent: Jun. 16, 1992

[54] MISGRIP SENSOR FOR A SUPPORT MEMBER

[75] Inventor: Tsutomu Kawahara, Southgate, Mich.

[73] Assignee: Mazda Motor Manufacturing (USA) Corporation, Japan

[21] Appl. No.: 647,612

[22] Filed: Jan. 29, 1991

[51] Int. Cl.⁵ .............................................. G08B 21/00
[52] U.S. Cl. .................................... 340/540; 29/721; 340/568; 340/686; 340/679
[58] Field of Search ............... 340/686, 673, 540, 679, 340/568; 29/721, 707

[56] References Cited

U.S. PATENT DOCUMENTS

| H182 | 1/1987 | Heller | 340/568 |
| 3,553,671 | 1/1971 | Hopkins | 340/686 |
| 4,525,706 | 6/1985 | Nishikawa et al. | 340/679 |

FOREIGN PATENT DOCUMENTS 6071436 10/1983 Japan.

Primary Examiner—Glen R. Swann
Attorney, Agent, or Firm—Thompson, Hine and Flory

[57] ABSTRACT

A misgrip sensor cooperates with a support member, the support member being of the type having an arm for supporting a workpiece during a plurality of forming operations. The sensor detects improper engagement of a workpiece by the support arm and includes a support housing, a contact rod journaled in the front and rear walls of the housing for rectilinear movement and having a collar mounted thereon, a proximity switch mounted on the housing adjacent to the rod for generating a signal indicating proper engagement of a workpiece by the arm, a sensor plate slidably mounted on the rod between the front wall of the housing and the proximity switch and first and second springs which act in opposition to urge the sensor plate against the contact rod collar at an equilibrium position coincident with a non-actuation position spaced from the proximity switch. Displacement of the contact rod toward a rear wall of the housing by a workpiece engaged by the support arm such that the collar is displaced between the actuation position and the rear wall enables the first spring to urge the sensor plate from the non-actuation position to an actuation position, and subsequent, relatively minor movements of the contact rod and collar do not displace the sensor plate from the actuation position so that false signals from the proximity switch are prevented. In a preferred embodiment, the sensor includes a stop, fixed to the housing, which holds the sensor plate a predetermined distance from the proximity switch in the actuation position.

23 Claims, 3 Drawing Sheets

5,122,782

MISGRIP SENSOR FOR A SUPPORT MEMBER

BACKGROUND OF THE INVENTION

The present invention relates to sensor switches and, more particularly, to misgrip sensor switches used in combination with arms supporting a workpiece during successive forming operations.

In many manufacturing operations, of which a stamping operation is typical, support arms are used to engage and hold a workpiece, which may begin the operation as a flat sheet of formable material such as steel. The support arms hold the workpiece loosely between upper and lower tools, such as a forming die set. Since a single workpiece of sheet metal may be conveyed to successive die sets for a complete forming operation, it is necessary that the support arms hold the workpiece continuously, conveying it between the successive die sets on a line.

Since such forming operations are highly automated, it is necessary for the controller which operates the support arms to detect whether a sheet workpiece is not picked up by the support arms, is misregistered on the support arms, or falls from the support arms between successive forming operations. Consequently, such support arm systems typically include misgrip sensors. The typical misgrip sensor includes a contact arm having an outer head positioned to be engaged by a workpiece when properly engaged by the support arms and a housing slidably receiving the contact arm. The contact arm includes a body having a recess positioned to receive the end of a microswitch mounted within the housing.

Displacement of the contact rod a predetermined amount enables the microswitch end to engage the recess in the contact rod body, thereby closing the switch which generates a signal indicating proper engagement of the workpiece by the arms. Improper engagement of a workpiece by the support arms does not displace the rod sufficiently, if at all, so that the switch remains in an open position indicating an error condition.

A disadvantage with such types of switches is that the microswitch can stick, thereby giving a false reading of misalignment, or a threshold condition may occur where the workpiece is properly aligned but the contact rod is not displaced sufficiently to enable the microswitch to fully engage the recess, also creating a false error condition. Accordingly, there is a need for a misgrip sensor which detects proper engagement of a workpiece by support arms with a minimum of false readings.

SUMMARY OF THE INVENTION

The present invention is a misgrip sensor for a support member which utilizes a proximity switch and a sensor plate which is moved by a contact rod into an actuating position when the workpiece is properly engaged by the support member. The sensor plate is slidably mounted on the contact rod and therefore relatively small movements of the contact rod subsequent to the engagement of the workpiece or variations in the initial displacement do not result in false signals of misalignment. Accordingly, the sensor of the present invention has greater reliability and consistency of performance than prior art sensors.

In the preferred embodiment, the sensor includes a housing adapted to be mounted on a support arm, a contact rod received in the support housing for rectilinear movement, a proximity switch mounted in the housing, a sensor plate slidably mounted on the contact rod, and spring members for holding the sensor plate in an equilibrium position which coincides with a non-actuation position relative to the proximity switch. Also in the preferred embodiment, the contact rod includes a fixed collar having a shoulder and the spring members include a first spring member which extends along the contact rod between the sensor plate and the housing, and a second spring member which extends along the contact rod between the collar and the housing. The two springs oppose each other to urge the sensor plate and collar together at the equilibrium point.

Displacement of the contact rod resulting from contact by a properly-supported workpiece causes the collar to be displaced from the equilibrium position, thereby compressing the second spring member and enabling the first spring member to displace the sensor plate along the contact rod to an actuation position adjacent to the proximity switch. Subsequent, small-magnitude displacements of the contact rod, which might result from movement of the workpiece during stamping operations, do not cause the collar to engage the sensor plate and displace it from the actuation position. Consequently, the proximity switch remains in an "on" mode and the likelihood of false signals of misalignment is substantially reduced.

Accordingly, it is an object of the present invention to provide a misgrip sensor for a support member in which the likelihood of false readings of misalignment is substantially reduced; a misgrip sensor which utilizes a proximity switch that eliminates the inconsistency of mechanical contact switches; a misgrip sensor which can compensate for relatively minor movements of the workpiece being supported without giving a false signal of misalignment; and a misgrip sensor which is low-cost and relatively simple to construct and maintain.

Other objects and advantages will be apparent from the following description, the accompanying drawings and the appended claims.

DETAILED DESCRIPTION

Figure 1:
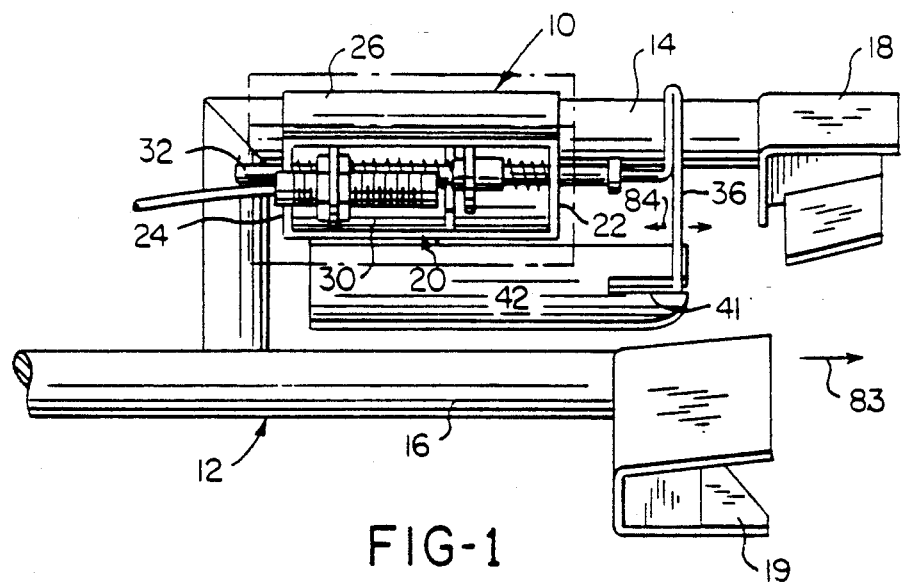
FIG. 1 is a perspective view of a preferred embodiment of the misgrip sensor of the present invention, enclosed by a broken line, shown mounted on a pair of support arms.

As shown in FIG. 1, the misgrip sensor of the present invention, generally designated 10, is adapted to be mounted on a support member, generally designated 12, which includes a pair of support arms 14, 16, each of which terminates in a workpiece-engaging bracket 18, 19

Figure 2:
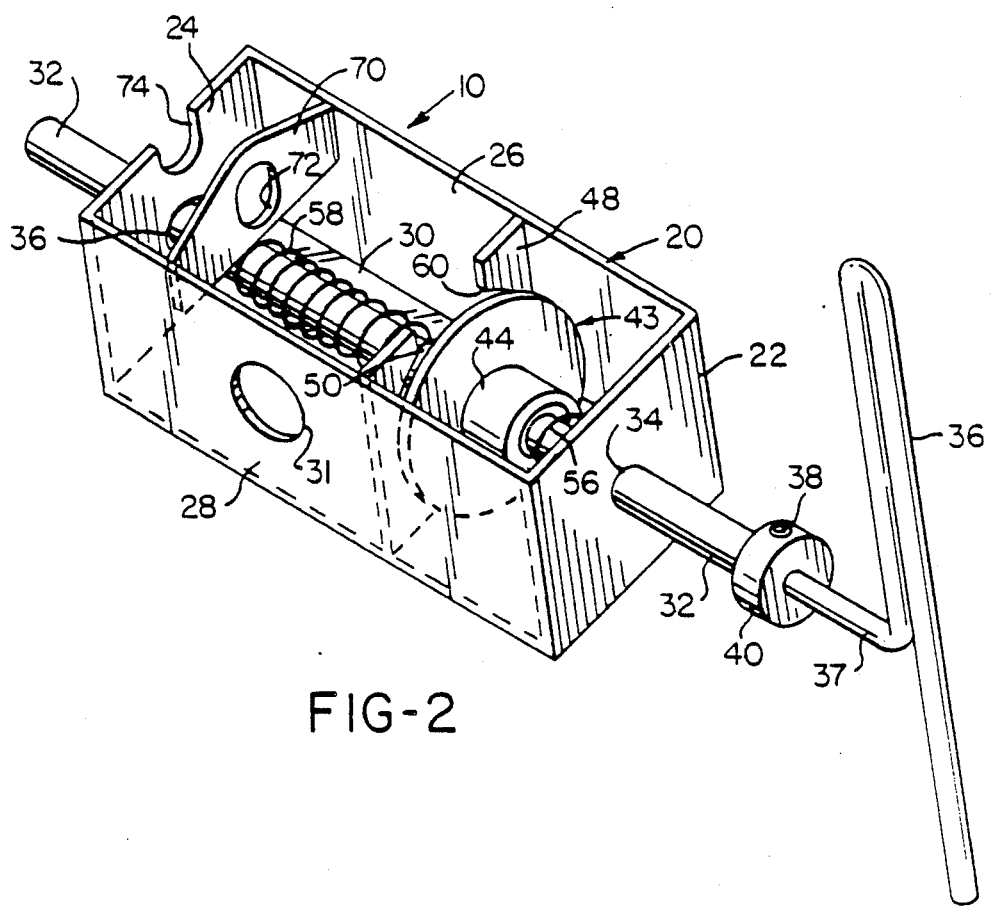
FIG. 2 is a perspective view of the misgrip sensor of FIG. 1.
Figure 3:
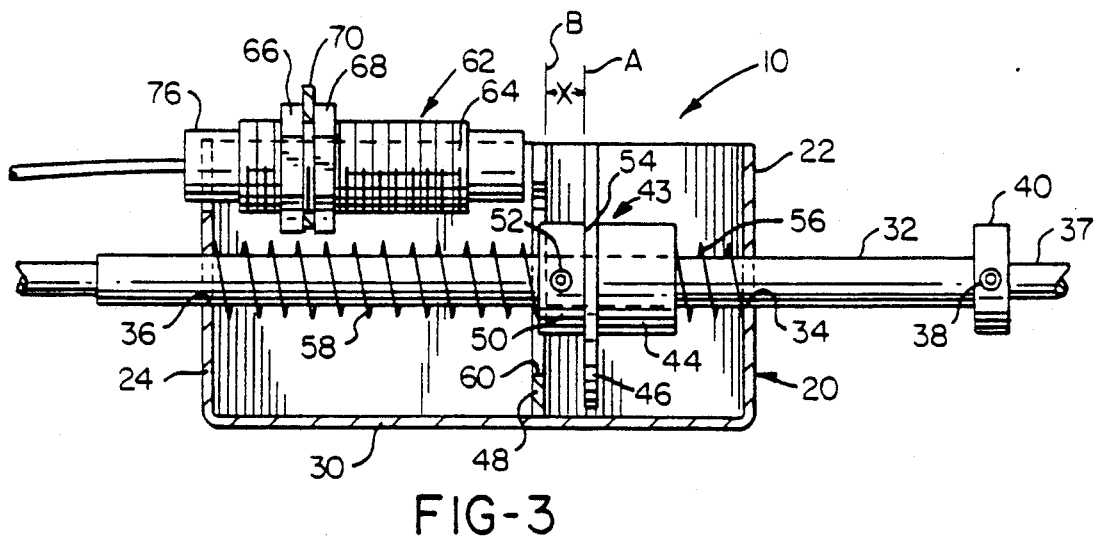
FIG. 3 is a side elevation, in section, of the misgrip sensor of FIG. 1, in which the sensor plate is in an equilibrium position.

As shown in FIGS. 1 and 2, the sensor 10 includes a housing 20 having a front wall 22 oriented toward the workpiece to be supported by the member 12, a rear wall 24 opposite the front wall, sidewalls 26, 28 and a bottom wall 30. Side wall 28 includes an access hole 31. The bottom wall includes holes (not shown) to receive mounting bolts to attach the housing 20 to support arm 14. As shown in FIGS. 2 and 3, a tubular contact rod 32 is journaled through orifices 34, 36 in the front and rear walls 22, 24, respectively.

A rod extension 34 is telescoped within the contact rod 32 and includes a T-shaped head 36. The extension rod 34 is held in position by a set screw 38 which extends through a bushing 40 fixed on the end of the contact rod 32. Consequently, the extension rod 34 can be adjusted to vary the distance between the head 36 and the housing 20. As shown in FIG. 1, the head 36 is captured within a slot 41 in a guide 42 which is attached to the arm 14.

Figure 4:
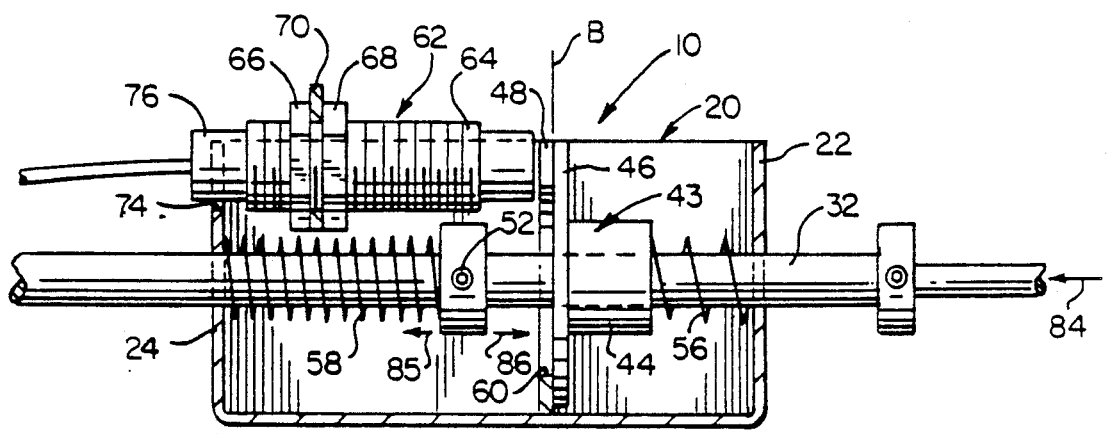
FIG. 4 is a side elevation, in section, of the sensor of FIG. 3 in which the sensor plate is displaced to an actuation position.

As shown in FIGS. 2, 3 and 4, a sensor plate 43 is slidably mounted on the contact rod 32 and includes a cylindrical bushing 44 attached to a disc-shaped sensor member 46. The sensor plate 43 is captured between the front wall 22 of the housing and a stop plate 48 which extends between sidewalls 26, 28, so travel of the sensor plate 43 on contact rod 32 is limited to this forward space in the housing 20. A cylindrical collar 50 is adjustably mounted on the contact rod 32 and is retained in position by a set screw 52. The position of collar 50 can be adjusted by access to set screw 52 through hole 31. The collar 50 includes a forward-facing shoulder 54.

A forward or first extension spring 56 extends between the front wall 22 and the bushing 44 to urge the sensor plate 42 rearwardly toward the stop plate 48. A second or rearward extension spring 58 extends between the rear wall 24 and the collar 50. Springs 56, 58 are both mounted on and concentric with the contact rod 32, and the rearward spring urges the collar 50 forwardly through an opening 60 in the stop plate 48 so that the shoulder 54 abuts the sensor member 46 of the sensor plate 43. The forward and rearward springs 56, 58 therefore oppose each other and are sized such that their opposing forces result in an equilibrium position, denoted by line A in FIG. 3, a distance X from the stop plate 48.

A proximity switch 62, such as a Namco Model ET320-43410, is mounted on the housing 20 and includes a threaded body 64 which receives a pair of mounting nuts 66, 68. Mounting nuts 66, 68 are adjusted to pinch a mounting plate 70 (see also FIG. 2) which includes an opening 72 shaped to receive the threaded body 64 therethrough. The rear wall 24 also includes a notch 74 shaped to provide clearance for the rearward portion 76 of the proximity switch 62. The proximity switch 62 is positioned on the mounting plate 70 such that the displacement of the sensor plate 43 to a position abutting the stop plate 48 actuates the switch to an "on" position so that the switch generates a signal to a controller (not shown) which indicates that a workpiece is properly supported by the brackets 18 (see FIG. 1). This abutting position is therefore described as an actuation position and is denoted by line B in FIGS. 2 and 3. In contrast, the sensor plate 43 position denoted by line A in FIG. 3 is at a non-actuating position and does not actuate the switch 62 to an "on" configuration.

Figure 5:
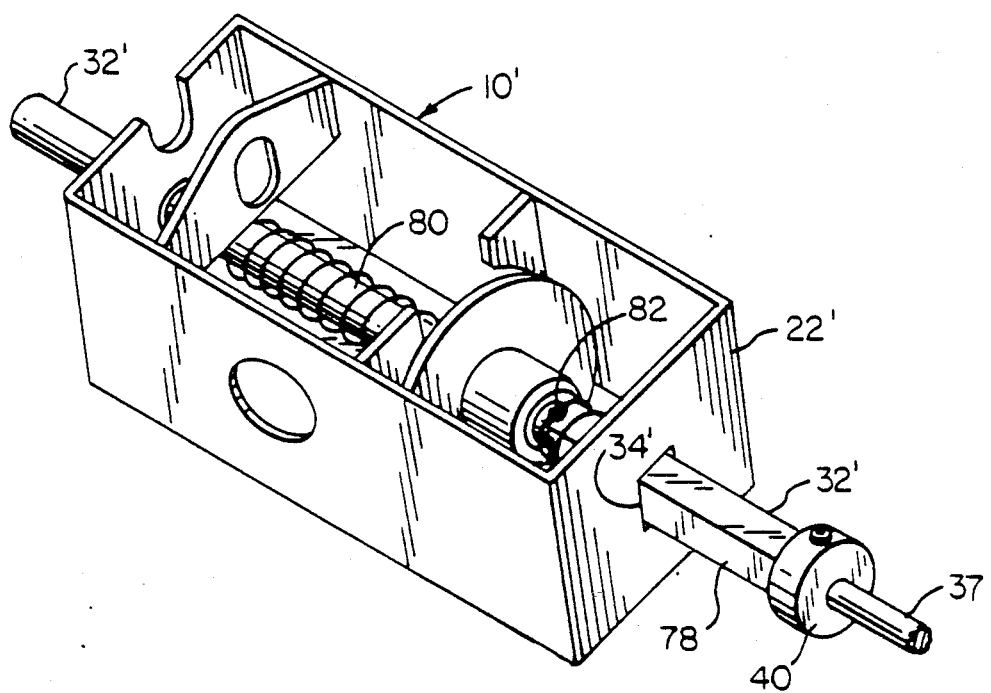
FIG. 5 is a perspective view of an alternate embodiment of the invention.

As shown in FIG. 5, an alternate embodiment of the sensor 10' includes a front wall 22' having a square opening 34' that receives a segment 78 of rod 32' having a square cross section. Segment 78 is attached to segment 80 by a spot weld 82 and to bushing 40 by a spot weld (not shown). Both segments 78,80 are tubular and hollow to receive rod 34.

Engagement of segment 78 with hole 34' prevents rotation of rod 32' relative to the sensor 10', thereby eliminating the need for external means such as engagement of slot 41 by head 36.

The operation of the misgrip sensor 10 is as follows. Prior to the support member 12 engaging a workpiece, the sensor 10 assumes the configuration shown in FIG. 3 in which the sensor plate 43 is at the non-actuation position A, so that proximity switch 62 is not activated. As the support member 12 moves in the direction of arrow 83 (see FIG. 1) to engage a workpiece, the adjacent edge of the workpiece engages the head 36 of the contact rod 32 and displaces the contact rod rearwardly in the direction of arrow 84 (see FIGS. 1 and 4). This displacement causes collar 50 also to move in the direction of arrow 85 away from its equilibrium position to a displaced position rearwardly of the stop plate 48. This enables first spring 56 to extend further and displace the sensor plate 43 to the actuation position denoted by B in a position of abutment with stop plate 48.

This position actuates proximity switch 62 to generate an "on" signal which indicates that the workpiece is properly engaged by the brackets 18. Subsequent shifting of the workpiece during successive forming operations may result in a slight displacement of the contact rod 32 either forwardly or rearwardly, resulting in displacement of the collar 50 in the direction of arrows 85, 86 in FIG. 4. However, this slight displacement is not sufficient to enable the collar 50 to engage the sensor plate 43 and displace it from the actuation position B, which would generate a false error signal when the proximity switch 62 goes to an "off" configuration.

Further, the sensor 10 can accommodate workpieces having minor variations in dimensions without generating a false error signal. As is apparent in FIG. 4, displacement of the contact rod 32 may vary somewhat, so long as the displacement is sufficient to position the collar 50 rearwardly of the stop plate 48. Consequently, the sensor 10 has much greater flexibility than prior art sensors, and does not require frequent adjustment to compensate for minor variations in workpiece size. It should also be noted that the proximity switch 62 can be selected such that the forward face of the proximity switch acts as the stop plate 48, so that the sensor plate 43 abuts it in the actuation position B; such a minor variation does not depart from the scope of the invention.

While the forms of apparatus herein described constitute preferred embodiments of this invention, it is to be understood that the invention is not limited to these precise forms of apparatus, and that changes may be made therein without departing from the scope of the invention.

What is claimed is:

1. For use with a workpiece holding member of the type having an arm for supporting a workpiece during a plurality of forming operations, a misgrip sensor for detecting improper engagement of a workpiece by said arm, comprising:

a support bracket;

means moveably mounted on said support bracket for contacting a workpiece engaged by said arm, said contact means having a shoulder fixed thereon;

a sensor plate mounted on said contact means and movable relative thereto;

means, fixed relative to said support bracket and responsive to displacement of said sensor plate from a non-actuation position to an actuation position adjacent thereto, for generating a signal indicating proper engagement when said sensor plate is in said actuation position;

means, fixed relative to said support bracket, for stopping movement of said sensor plate at said actuation position; and means for biasing said sensor plate and said shoulder against each other to an equilibrium position coincident with said non-actuation position, such that displacement of said contact means by a workpiece supported by said arm sufficiently to displace said shoulder toward said stop means enables said biasing means to urge said sensor plate against said stop means at said actuation position, thereby causing said signal means to generate a signal indicating proper workpiece engagement, and relatively minor displacement of said contact means do not enable said shoulder to displace said sensor plate from said actuation position, whereby false readings of improper engagement are prevented.

2. The misgrip sensor of claim 1 wherein said signal means comprises a proximity switch.

3. The misgrip sensor of claim 2 wherein said contact means comprises a contact rod mounted on said support member for rectilinear movement, said sensor plate being slidably mounted on said contact rod for movement toward and away from said proximity switch between said non-actuation and actuation positions.

4. The misgrip sensor of claim 3 wherein said bias means comprises a first resilient member positioned to urge said sensor plate against said shoulder.

5. The misgrip sensor of claim 4 wherein said bias means further comprises a second resilient member positioned to urge said contact rod and said shoulder away from said stop means.

6. The misgrip sensor of claim 5 wherein said sensor plate comprises a bushing slidably mounted on said contact rod and a plate member extending radially outwardly therefrom.

7. The misgrip sensor of claim 6 wherein said first resilient member comprises a first coil spring, concentric with said contact rod and extending from said away from said stop means bushing to said support bracket.

8. The misgrip sensor of claim 7 wherein said second resilient member comprises a second coil spring, concentric with said contact rod and extending from said shoulder member away from said stop means and said first resilient member to said support bracket, said first and second coil springs acting in opposition to hold said sensor plate at said equilibrium position.

9. The misgrip sensor of claim 8 wherein said stop means is mounted on said support bracket and coincides with said actuation position.

10. The misgrip sensor of claim 9 wherein said shoulder comprises an annular collar mounted adjustably on said contact rod.

11. The misgrip sensor of claim 10 wherein said contact rod includes an adjustable extension segment for contacting a workpiece.

12. The misgrip sensor of claim 11 wherein said extension segment telescopes within said contact rod.

13. The misgrip sensor of claim 3 wherein said contact rod includes a non-round segment and said support member includes a correspondingly-shaped hole receiving said segment therethrough, whereby engagement of said segment with said hole prevents rotation of said rod relative to said support member.

14. The misgrip sensor of claim 13 wherein said segment and said hole are square in cross section.

15. For use with a workpiece holding member of the type having an arm for supporting a workpiece during a plurality of forming operations, a misgrip sensor for detecting improper engagement of a workpiece by said arm, comprising:

a support housing having a front wall for orientation proximate said workpiece and a rear wall at an opposite end of said housing;

a contact rod journaled in said front and rear walls and extending through said housing for rectilinear movement relative thereto, said contact rod having a collar fixed thereon;

a proximity switch mounted in said housing adjacent to said rod for generating a signal indicating proper engagement of a workpiece by said arm;

a sensor plate slidably mounted on said contact rod between said front wall and said proximity switch, and movable between a non-actuating position and an actuating position adjacent to said proximity switch wherein said switch generates a signal;

first resilient means, extending between said front wall and said sensor plate, for urging said sensor plate to said actuating position;

second resilient means, extending between said collar and said rear wall, for urging said collar against said sensor plate, said second resilient means having a force greater than that of said first resilient means such that said sensor plate assumes an equilibrium position at said non-actuating position;

whereby displacement of said contact rod toward said rear wall by a workpiece engaged by said arm such that said collar is between said actuation position and said rear wall enables said first resilient means to urge said sensor plate to said actuation position, and subsequent, relatively minor, movements of said contact rod and collar do not displace said sensor plate from said actuation position so that false signals from said proximity switch are prevented.

16. The misgrip sensor of claim 15 wherein said first resilient means comprises a first coil spring concentric with said contact rod.

17. The misgrip sensor for claim 16 wherein said second resilient means comprises a second coil spring concentric with said contact rod.

18. The misgrip sensor of claim 15 wherein said sensor plate comprises a bushing slidably mounted on said contact rod and a plate member extending radially outwardly from said bushing.

19. The misgrip sensor for claim 16 further comprising stop means, mounted on said housing, for engaging said sensor plate at said actuation position.

20. The misgrip sensor of claim 17 wherein said stop means engages said plate member.

21. The misgrip sensor of claim 18 wherein said contact rod includes an adjustable extension segment.

22. The misgrip sensor of claim 15 wherein said contact rod includes a non-round segment and said front wall includes a correspondingly-shaped hole receiving said segment therethrough, whereby engagement of said segment with said hole prevents rotation of said rod relative to said support member.

23. The misgrip sensor of claim 22 wherein said segment and said hole are square in cross section.

* * * * *